US009319286B2

(12) United States Patent
Panuganty (10) Patent No.: US 9,319,286 B2
(45) Date of Patent: Apr. 19, 2016

(54) APPARATUS AND METHODS FOR MANAGING APPLICATIONS IN MULTI-CLOUD ENVIRONMENTS (71) Applicant: Cognizant Business Services Limited, Jersey (GB)

(72) Inventor: Ramesh Panuganty, Cupertino, CA (US)

(73) Assignee: COGNIZANT BUSINESS SERVICES LIMITED, St. Helier, Jersey (GB)

( * ) Notice: Subject to any disclaimer, the term of this patent is extended or adjusted under 35 U.S.C. 154(b) by 183 days.

(21) Appl. No.: 13/747,724

(22) Filed: Jan. 23, 2013

(65) Prior Publication Data
US 2013/0263209 A1 Oct. 3, 2013

Related U.S. Application Data (60) Provisional application No. 61/618,348, filed on Mar. 30, 2012.

(51) Int. Cl.
*G06F 9/44* (2006.01)
*H04L 12/26* (2006.01)
*H04L 29/06* (2006.01)
*H04L 12/24* (2006.01)

(52) U.S. Cl.
CPC ............ *H04L 43/04* (2013.01); *H04L 41/0893* (2013.01); *H04L 41/5025* (2013.01); *H04L 43/08* (2013.01); *H04L 63/20* (2013.01)

(58) Field of Classification Search
CPC ......... H04L 63/20; H04L 41/04; H04L 41/08; H04L 43/04; H04L 43/08; H04L 41/5025; H04L 41/0893

USPC .................. 717/101–103, 120–121, 171–173
See application file for complete search history.

(56) References Cited

U.S. PATENT DOCUMENTS 7,797,453 B2  9/2010  Meijer et al.
8,014,308 B2  9/2011  Gates, III et al.
8,271,974 B2  9/2012  Mazhar et al.
(Continued)

OTHER PUBLICATIONS

Cisco, "Designing Secure Multi-Tenancy into Virtualized Data Centers", Mar. 2010, Cisco Systems, Inc., 82 pages.*
(Continued)

*Primary Examiner* — Ted T Vo
(74) *Attorney, Agent, or Firm* — Rothwell, Figg, Ernst & Manbeck, p.c.

(57) ABSTRACT

A system, method, and medium are disclosed for managing application deployments on cloud infrastructures. The system comprises a services console configured to store management policies. Each management policy corresponds to a respective application deployment on one or more clouds and indicates (1) one or more potential runtime conditions and (2) one or more corresponding management actions. The system further comprises a monitoring engine configured to monitor runtime conditions of the application deployments, and to determine that runtime conditions of a given application deployment match the one or more potential conditions indicated by a given management policy corresponding to the given application deployment. The system also includes a policy engine configured to respond to the determination of the monitoring engine by performing the one or more management actions of the given management policy.

38 Claims, 4 Drawing Sheets (56) References Cited

U.S. PATENT DOCUMENTS 9,043,751 B2 5/2015 Mazhar et al.
2012/0096149 A1* 4/2012 Sunkara et al. ............... 709/224

OTHER PUBLICATIONS

Buyya, R., et al., "Market-Oriented Cloud Computing: Vision, Hype, and Reality for Delivering IT Services as Computing Utilities," GRIDS Laboratory, Dept. of Computer Science and Software Engineering, The Univ. of Melbourne, Australia, 9 pages, appears in 10th IEEE Conference on High Performance Computing and Communications, 2008, HPCC '08, Sep. 2008.

Calheiros, R. N., et al., "CloudSim: A Tookit for the Modeling and Simulation of Cloud Resource Management and Application Provisioning Techniques," Software: Practice and Experience, 41(1):23-50, Wiley, Jan. 2011, http://dx.doi.org/10.1002/spe.995; 23 pages.

Urgaonkar, B., et al, "Agile Dynamic Povisoning of Mul-Tier Inenet Appicatons," ACM Transactions on Autonomous and Adaptive Systems, vol. 3, No. 1, Article 1, Mar. 2008, 39 pages.

Vazquez, C., et al., "Dynamic Provision of Computing Resources from Grid Infrastructures and Cloud Providers," IEEE Computer Society, 2009 Workshops at the Grid and Pervasive Computing Conference, pp. 113-120.

Henderson, N., "Amazon Launches AWS Marketplace for One-Click Cloud App Deployment," Apr. 19, 2012, 7 pages, http://www.thewhir.com/web-hosting-news/amazon-launches-aws-market.

Right Scale, Cloud Management Automation Engine, http://www.rightscale.com/products/automation-engine.php, 11 pages, initially accessed Aug. 7, 2012.

Right Scale, Cloud Management MultiCloud Platform, http://www.rightscale.com/products/multi-cloud-platform.php, 10 pages., initially accessed Aug. 7, 2012.

UC Grid Portal, Home page, https://portal.ucgrid.org/gridsphere/gridsphere, 2 pages, 2006.

Appleby, K., et al. "Oceano—SLA Based Management of a Computing Utility," Integrated Network Management Proceedings, 2001 IEEE/IFIP International Symposium, Seattle, WA, May 14-18, 2001, DOI 10.1109/INM.2001.918085, 14 pages.

Martin, J., Design and Strategy for Distributed Data Processing, Englewood Cliffs, NJ: Prentice-Hall, Inc., 1981, 644 pages.

Opening Brief in Support of Defendants' Rule 12(b)(6) Motion to Dismiss for Failure to Allege Infringement of a Patentable Claim Under 35 U.S.C. § 101; *Kaavo Inc.* v. *Appfog*, et al.; C.A. No. 1:14-01193-LPS-CJB; Filed Feb. 2, 2015, Dist. DE; 24 pages.

Opening Brief in Support of Defendants' Rule 12(b)(6) Motion to Dismiss for Failure to Allege Infringement of a Patentable Claim Under 35 U.S.C. § 101; *Kaavo Inc.* v. *Appfog*, et al.; C.A. No. 14/1193-LPS-CJB; Filed Dec. 19, 2014, Dist. DE; 26 pages.

Motion of Defendant Cognizant Technology Solutions Corporation Under Fed. R. Civ. P. 12(c) for Judgment on the Pleadings Pursuant to 35 U.S.C. § 101; *Kaavo Inc.* v. *Cognizant Technology Solutions Corporation*; C.A. No. 14-1192 (LPS); Filed Feb. 3, 2015; Dist. DE; 6 pages.

Complaint in *Kaavo Inc.* v. *Cognizant Technology Solutions Corporation*, C.A. No. 99-mc-09999, filed Jul. 24, 2015 in the U.S. District Court for the District of Delaware, 34 pages.

* cited by examiner

APPARATUS AND METHODS FOR MANAGING APPLICATIONS IN MULTI-CLOUD ENVIRONMENTS

CROSS REFERENCE TO RELATED APPLICATIONS

This application claims priority to U.S. Provisional Patent Application No. 61/618,348 filed Mar. 30, 2012, which is incorporated herein by reference.

BACKGROUND

Increasingly, network applications and services are deployed on "cloud" infrastructures. In many cloud infrastructures, a third-party "cloud provider" owns a large pool of physical hardware resources (e.g., networked servers, storage facilities, computational clusters, etc.) and leases those hardware resources to users for deploying network applications and/or services.

Rather than leasing the hardware resources directly, the cloud provider often allows clients to specify and lease "virtual machines" that match the client's specifications. The virtual machines are then deployed on the cloud-provider's hardware resources. The underlying hardware resources implementing the cloud are therefore invisible to the client, who sees only the virtual machines.

Cloud infrastructures enable many benefits both for the software administrators and for the hardware owners (i.e., cloud providers). Software administrators can specify and lease computing resources (i.e., virtual machines) matching their exact specifications without up-front hardware purchase costs. The administrators can also modify their leased resources as application requirements and/or demand changes. Hardware owners (i.e., cloud providers) also realize substantial benefits from cloud infrastructures. The provider can maximize hardware utilization rates by hosting multiple virtual machines on a single physical machine without fear that the applications executing on the different machines may interfere with one another. Furthermore, the ability to easily migrate virtual machines between physical machines decreases the cloud provider's hardware maintenance costs. For these reasons, even large companies that own substantial hardware resources (e.g., search engine companies, social networking companies, e-commerce companies, etc.) often deploy those hardware resources as private clouds.

Today, many network applications and services are hosted on cloud infrastructures. For examples, Internet startups often deploy their web applications on cloud infrastructures rather than purchase hardware, IT departments use cloud infrastructures to deploy various IT services (such as email, social networking, backup storage, etc.), and web giants deploy their own hardware resources as private clouds.

As the demand for cloud computing has grown, so has the number of cloud computing providers. Different cloud providers often offer different qualities of service, different pricing, and/or other distinctive features that make those particular providers more desirable for one purpose or another. Accordingly, some organizations lease resources from multiple cloud providers. Unfortunately, the interfaces to different providers often differ and managing multiple deployments on multiple clouds has become a problem for many organizations.

SUMMARY

A system, method, and medium are disclosed for managing application deployments on cloud infrastructures. The system comprises a services console configured to store management policies. Each management policy corresponds to a respective application deployment on one or more clouds and indicates (1) one or more potential runtime conditions and (2) one or more corresponding management actions. The system further comprises a monitoring engine configured to monitor runtime conditions of the application deployments, and to determine that runtime conditions of a given application deployment match the one or more potential conditions indicated by a given management policy corresponding to the given application deployment. The system also includes a policy engine configured to respond to the determination of the monitoring engine by performing the one or more management actions of the given management policy.

In some embodiments, the monitoring engine may be configured to monitor runtime conditions of the application deployments on multiple cloud infrastructures. In some embodiments, the system may comprise multiple service consoles, each dedicated to serving a different respective organization.

In some embodiments, the system includes a management console for managing one or more cloud deployments. The management console may be configured to present a user with an interface configured to receive the management policies for one or more cloud infrastructures. For example, the interface may take the form of a web portal.

In some embodiments, the management console may also be configured to receive and implement one or more authorization policies, each corresponding to a respective application deployment on one or more clouds, and comprising parameters for determining whether a given user has authority to perform a given management action on the application deployment. For example, an authorization policy may indicate that in response to an attempt to perform a given management action, the management console should authorize the attempt, deny the attempt, seek authorization of the attempt, and/or send a notification to a user other than the given user attempting to perform the management action. The parameters of the authorization policies may include one or more of: a role of the given user, runtime conditions of the application deployment, business goals, and/or other parameters. In some embodiments, the management console may be configured to seek authorization of the attempt using a programmatic interface of a business workflow tool.

In some embodiments, the system may include a configuration database that maintains data describing the application deployments. For example, the information may include data describing identities of the applications deployed, respective computing resources provisioned for the applications, respective sources of the computing resources provisioned for the applications, respective configuration information for the applications, respective virtual machine templates for the applications, etc.

In some embodiments, the services console may be configured to store resource placement policies. Each such policy may correspond to a respective application deployment on one or more clouds and include parameters for identifying one or more preferred sources from which additional computing resources can be provisioned for the application deployment. For example, the parameters may depend on monitored runtime conditions of the application deployment, administrator roles, business goals, static policies, and/or other parameters. In various embodiments, the preferred sources identified may be of different degrees of specificity (e.g., a specific cloud provider, a specific cloud account, a specific data center, a specific compute cluster, a specific hypervisor, a specific storage device, a specific geographic region, etc.).

In some embodiments, the potential runtime conditions of the management policies may include workload conditions, system services layer conditions, resource utilization conditions, physical machine conditions, derived analytics, and/or others. The conditions may be aggregated using Boolean combinations (e.g., a potential runtime condition may be expressed as a Boolean combination of two or more potential runtime conditions).

In some embodiments, a management action may include such actions as provisioning resources to the corresponding application deployment, deprovisioning resources to the corresponding application deployment, adding a ticket to a bug tracking system, creating an event that triggers another of the management policies, etc.

In some embodiments, the monitoring engine may monitor the runtime conditions using software agents deployed on respective virtual machines in the application deployment. Thus, the monitoring engine may receive periodic reports from the software agents regarding runtime conditions on those virtual machines.

In some embodiments, the monitoring engine may be configured to determine that the runtime conditions of a given application deployment match the one or more potential conditions, and in response, to increment a counter. In such embodiments, the policy engine may be configured to perform the management action only when the counter reaches a given count rather than immediately upon each event. In some embodiments, the monitoring engine may be configured to increment the same counter by a different weight in response to different events (i.e., in response to determining that the runtime conditions match different management policies).

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

As the number of clouds and cloud-deployed applications and services being used by organizations has grown, so too has the difficulty of managing those deployments.

First, it is cumbersome for organizations to manage applications across multiple cloud providers. A single organization may have many network applications and services, which may be deployed at multiple different cloud providers. These application deployments must often conform to particular organizational policies and compliance needs. Deploying applications on multiple cloud infrastructures and monitoring/managing those applications to conform to organizational goals is a difficult task. Multi-cloud application management is even further complicated because each cloud provider may expose its own unique interface for monitoring and managing the applications. Such interfaces may comprise provider-specific programmatic interfaces, communication protocols, web portals, and/or other interfaces. These multiple interfaces aggravate the difficulty of monitoring and managing the applications because they require application administrators to visit multiple portals and/or build redundant tools. Accordingly, a single interface for managing multiple cloud deployments is desirable.

Second, it is difficult for organizations to effectively monitor and manage their virtual machines on the cloud. Administrators would ideally like to minimize cost by leasing only a level of virtual computing resources that is appropriate for the demand on a given application. However, such optimization traditionally requires manual monitoring and reconfiguration of provisioned resources at each cloud provider. Accordingly, facilities for automatically monitoring and re-provisioning cloud-based resources are desirable.

Third, even when an administrator determines that new cloud-based resources should be provisioned (e.g., in response to growing demand), the administrator must decide which resources to provision and/or from which provider to provision those resources. The optimal choice may depend on various factors, such as demand patterns or business goals. For example, if demand is coming from a particular geographical region, it may be prudent to provision resources from servers in that geographical region and/or to eliminate resources from a low-demand geographical region. Provisioning decisions may be even further complicated for multi-tier applications, in which each tier may be deployed on separate virtual machines and managed by separate administrators. In such instances, provisioning decisions for a single multi-tiered application may require input from different administrators within an organization. Accordingly, automated facilities for intelligent provisioning of cloud-based resources are desirable.

Fourth, although resource provisioning decisions often require input from multiple different administrators within an organization, it may not be desirable for the organization to empower every such administrator to provision arbitrary computing resources at any time. Allowing multiple administrators to provision resources without coordination may interfere with an organization's business goals, such as budgeting and service-level agreements. Moreover, uncoordinated provisioning may create technical inefficiencies, such as overloading one tier of a multi-tiered application by provisioning too many resources to another. Because each tier may be managed by a different administrator, such problems may easily arise. Even when if single cloud-provider provides means for managing permissions to different users, such means are of little utility when an organizations has deployed applications across multiple clouds. Accordingly, automated facilities for central control of provisioning decisions are desirable.

Fifth, many different people within an organization may need to deploy network applications and/or different instances of a given network application. For example, each member of a testing team may need to deploy a separate instance of a network application on a separate set of virtual computing resources for testing. Traditionally, each member would have to create and save a virtual configuration and if the test team lead wanted the team to test a different configuration, the new configuration would have to be propagated to each of the members. Accordingly, facilities for simple deployment of pre-defined network applications on custom virtual infrastructure are desirable.

According to various embodiments, a middleware system may provide facilities for managing multiple cloud deployments (e.g., at multiple providers) in a manner that mitigates the traditional difficulties expounded above. According to some embodiments, the middleware system may include a management console for viewing, monitoring, and managing software deployed at multiple cloud providers. The management console may thus provide a single interface for managing multiple cloud deployments. The management console may allow a user to set various cloud management policies for automatic implementation. Such policies may comprise user-specified rules, which may include one or more actions to take in response to one or more conditions detected.

The middleware system may include a backend service console for implementing the policies defined at the management console. For example, the service console may monitor conditions on deployed virtual machines to detect relevant events (e.g., workload spike, machine crash, etc.). In response to detecting an event, the services console may compare the event to the user-specified policies and take appropriate actions if the event matches the conditions specified in one or more of the policies. The actions may include throwing additional events, making a provisioning decision (e.g., provisioning additional or fewer resources), and/or any other management action. Thus, with appropriate policies, the system described herein may provide facilities for automatically monitoring and re-provisioning cloud-based resources.

In some embodiments, the user-specified policies may be used to implement intelligent placement of virtual resources. For example, a user may create policies that de-provision resources in a low-demand geographical area, provision additional resources in high-demand geographical area, provision resources on a low-latency infrastructure, provision resources on particular physical devices (compute node/network/storage) based on an evaluation algorithm, and/or other policies. Thus, the system described herein may provide automated facilities for intelligent provisioning of cloud-based resources.

In some embodiments, the system may provide facilities for controlling administrative permissions granted to various users. For example, the system may implement a role-based permissions structure where each administrator is associated with a given role and each role is associated with a given set of permissions. Thus, the ability of different administrators to provision additional resources may be controlled. Moreover, policies may be created that trigger authorization events in response to certain actions (e.g., provisioning requests) by administrators in certain roles. For example, a policy may indicate that attempts by an administrator to provision additional resources must be approved by the administrator's supervisor if the administrator has a given role and the provisioning would surpass a given threshold. The system may facilitate such policies by supplying administrators with a request approval interface and/or by integrating with pre-existing business workflow tools. Accordingly, the system may provide automated facilities for central control of provisioning decisions.

In some embodiments, the system may provide facilities for creating and providing access to application deployment profiles by various users. The system may include facilities that allow those users to deploy such predefined virtual infrastructures with minimal effort, such as via "one-click" deployment. For example, a test team leader may define a network application deployment template or a profile, complete with virtual infrastructure definition and network application configuration. The leader may then make the deployment template available to each test team member. After the leader makes the template available, the system may provide team members with an indication of the predefined template (e.g., via a web portal). Each team member may then easily deploy a respective instance of the application and virtual infrastructure based on the predefined template, such as by clicking a single deploy button corresponding to the template. Thus, the system may provide facilities for simple deployment of pre-defined network applications on custom virtual infrastructure. In some embodiments, the system may allow different team members to customize particular parameters of the application or virtual infrastructure during deployment.

Figure 1:
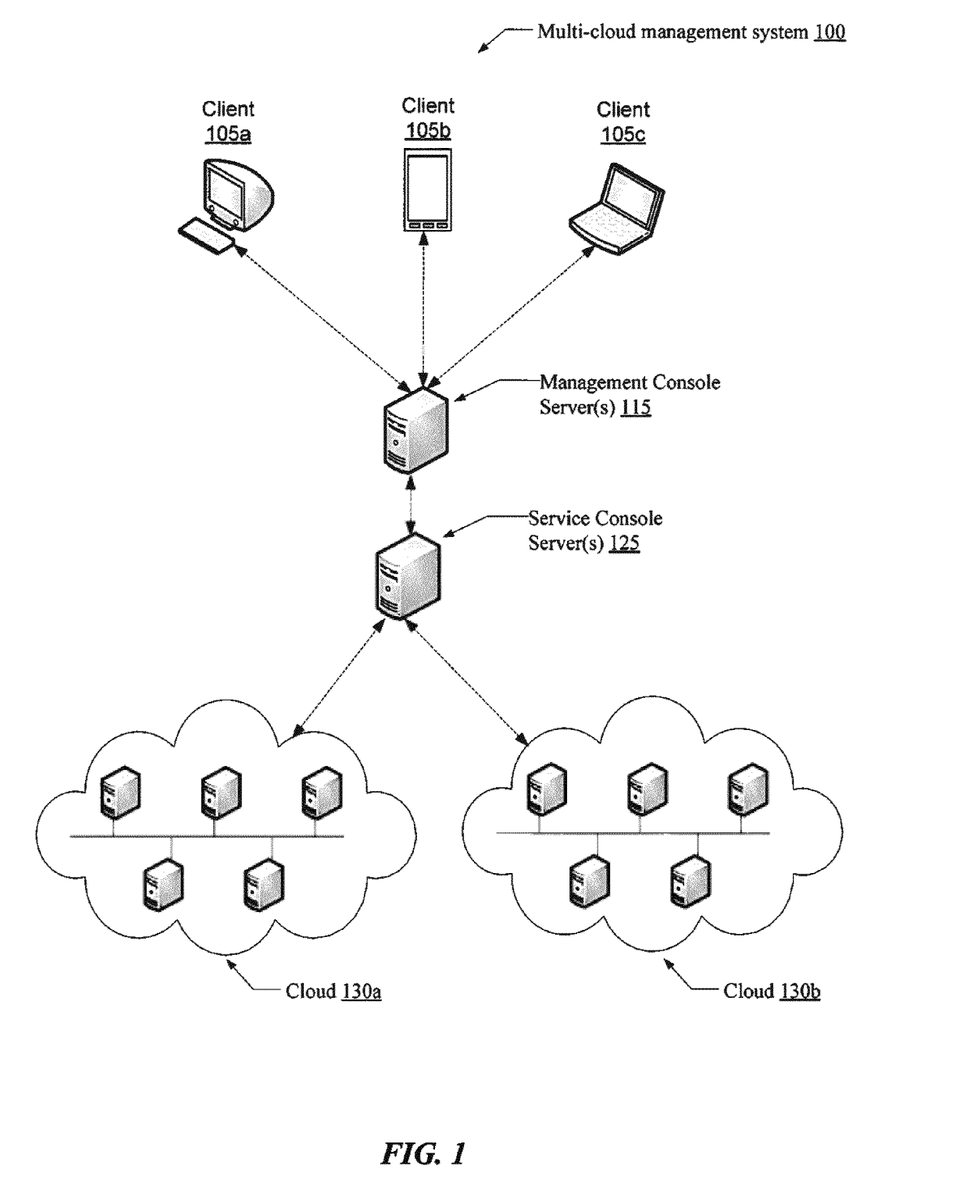
FIG. 1 is a schematic diagram illustrating the hardware environment of a multi-cloud management system, according to some embodiments.

FIG. 1 is a schematic diagram illustrating the hardware environment of a multi-cloud management system, according to some embodiments. Dashed lines indicate communications that may take place over any combination of one or more electronic communication networks, including local area networks (LAN) and/or wide area networks (WAN). The networks may use various communication protocols, including wireless networking protocols (e.g., WiFi), wired networking protocols (e.g., Ethernet), radio networking protocols (e.g., GSM, LTE), etc., and can be arranged in any configuration (e.g., point-to-point, broadcast, etc.). Such communications may utilize encryption, private networks, virtual private networks, and/or various other networking protocols and technologies.

According to FIG. 1, system 100 implements a client-server model where a plurality of clients 105a-105c connect to one or more management console servers 115 via a network. As illustrated, client hardware may correspond to any computing device, such as a desktop computer 105a, mobile device 105b, laptop 105c, and/or any other computing device.

Each of clients 105 may include respective software for accessing management console servers 115 via a network. In various embodiments, the respective software may include web browsers, browser plugins (e.g., "widgets"), and/or stand-alone applications. The software on clients 105 may be configured to access one or more interfaces (e.g., user or programmatic interfaces) exposed by management console servers 115 for managing the multi-cloud environment.

In the illustrated embodiment, multi-cloud management system 100 includes two levels of servers: (1) management console servers 115 (implementing one or more management consoles); and (2) service console servers 125 (implementing one or more services consoles). Servers 115 and/or 125 may comprise any number of physical and/or virtual machines (i.e., different physical machines, different virtual machines, and/or the same physical or virtual machines).

The management console provided by servers 115 may act as an intermediary between clients 105 and the service console provided by servers 125. For example, the management console may expose interfaces to clients 105 for setting multi-cloud management policies. Such interfaces may include user interfaces (e.g., web portals) and/or programmatic interfaces (e.g., web services, command line interfaces, console scripts, etc.). When a client uses such an interface to set a multi-cloud management policy, the management console may convey the policy to the services console of servers 125 for actuation, as described in more detail below.

The services console hosted on servers 125 may be configured to receive multi-cloud management policies from the management console hosted on servers 115 and to actuate those policies on multiple clouds, such as clouds 130a and 130b, any of which may be owned by different providers and/or be deployed as private clouds. As described in more detail below, the services console on servers 125 may be configured to monitor conditions on clouds 130, detect relevant events, and to implement the user-defined policies received based on those events.

In various embodiments, different organizations may control management console servers 115 and/or service console servers 125. For example, in some embodiments, an organization wishing to control its entire multi-cloud management middleware may deploy management console severs 115 and service console servers 125 on its own private network and/or on its own private cloud. In other embodiments, an organization may accept a multi-tenant usage model where the management console and service console are provided by a third-party cloud management provider. In such embodiments, the cloud management provider may control servers 115 and 125, using those servers to provide a single multi-tenant management console (e.g., password-controlled web portal) and separate service console instances for each organization. Thus, the multi-cloud management middleware may be provided by a third party as a service. In yet other embodiments, the multi-cloud management middleware may be provided in a hybrid fashion where a multi-tenant management console is provided by a third-party, but an organization deploys its own service console on servers in its private network. Thus, an organization may outsource the management console but retain control over the service console.

Clouds 130*a* and 130*b* may correspond to cloud platforms provided by different providers (e.g., Amazon EC2™) and/or to one or more private clouds. As shown in FIG. 1, each cloud may comprise many interconnected physical machines, which may be located at one or more data centers. The computing resources of the physical machines may be elastically allocated to different parties wishing to utilize the resources (e.g., to deploy a web application). The elastic allocation may be achieved by deploying a plurality of virtual machines on the physical machines, where each virtual machine emulates a physical machine with specific computing resources, such as processing, memory, storage, network bandwidth or latency, and/or other computing resources. Thus, organizations wishing to deploy a web application may provision a set of virtual machines on the cloud and deploy the web application on those virtual machines. Because the virtual machines need not be shared with other organizations, the owner of the virtual machines can completely control the application environment and need not be concerned with interference from collocated applications belonging to other parties.

Figure 2:
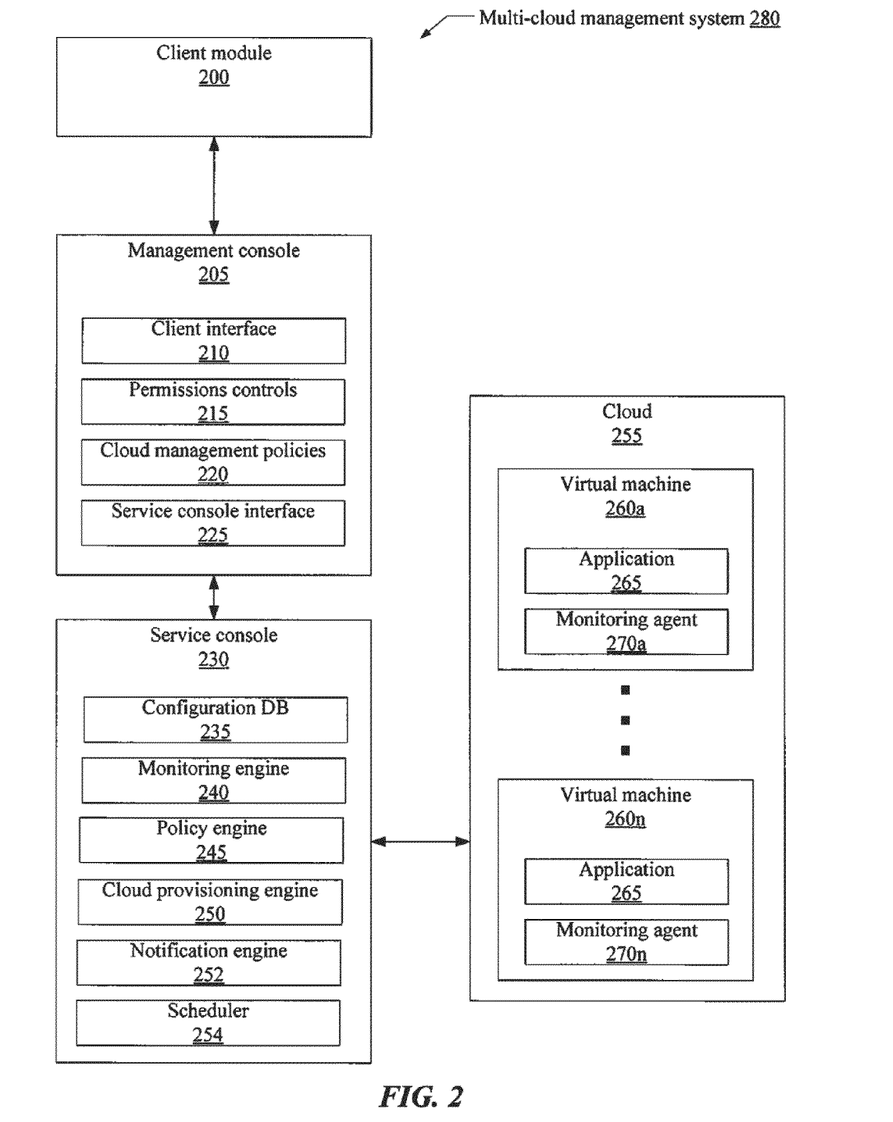
FIG. 2 is a block diagram illustrating the logical components of a multi-cloud management system, according to some embodiments.

FIG. 2 is a block diagram illustrating the logical components of a multi-cloud management system, according to some embodiments. In some embodiments, the components of FIG. 2 may be implemented as software executing on the corresponding hardware servers illustrated in FIG. 1. For example, client component 200 may execute on any of clients 105, management console 205 may execute on any of management servers 115, services console 230 may execute on any of servers 125, and cloud 225 may execute on any of clouds 130.

Client module 200 may correspond to any software configured to allow users to interact with management console 205 (e.g., via client interface 210). For example, client 200 may comprise a special-purpose stand-alone application configured to invoke network services and/or other network interfaces exposed by management console 205. In other embodiments, client 200 may comprise a general-purpose application, such as a web browser, configured to display a web portal implemented by management console 205. Thus, client module 200 may be configured to display a graphical user interface (e.g., web portal in a browser) with which a user may set one or more multi-cloud management policies.

In the illustrated embodiment, multi-cloud management system 280 includes management console 205, which may allow client module 200 to interface with service console 230, via client interface 210. Management console 205 may be provided by one or more servers on an organization's network and/or by a third-party application service provider over a wide area network (e.g., the Internet) as discussed above.

Management console 205 may expose various client interfaces 210. Client interfaces 210 may comprise web portals, network services, and/or other interface that client module 200 may invoke for setting management policies and/or for monitoring deployments. For simplicity, client interface 210 is assumed herein to implement a web portal accessible by a browser of client module 200.

According to the illustrated embodiment, management console 205 includes permissions controls 215, which may be used to set and enforce the permissions of different administrators within an organization. A single organization may include many different administrators, each possibly concerned with a different set of applications and/or even with a different tier within the same application. For example, different teams may be responsible for creating, deploying, and/or maintaining each application that an organization wishes to deploy. Moreover, within an organization that deploys a three-tier web application (i.e., web tier, business logic tier, and database tier), different teams may be responsible for creating, deploying, and/or maintaining each tier.

In some embodiments, permissions controls 215 enable an organization to create a respective account for each administrator and to set permissions that control the activities in which the administrator is permitted to engage. In some embodiments, permissions controls 215 may implement a role-based permission scheme where each user is assigned a role and each role is associated with a given set of permissions. In some embodiments, a given administrator's permissions may be modified further beyond the base permission set defined in the administrator's role.

In an example embodiment, where client interface 210 implements a web portal, permissions controls 215 may enforce given permissions by requiring that an administrator log in to the web portal and restricting the administrator from executing particular actions and/or viewing particular web pages based on the administrator's role and/or other permission settings. Permissions may be enforced in various other types of client interfaces 210, such as web services, command-line interfaces, and others.

Permissions controls 215 may be used to implement arbitrary permissions schemes. For example, different administrators may be restricted to setting management policies within a given scope of authority, such as policies concerning only particular applications, particular tiers within applications, particular cloud providers, etc. In some embodiments, an administrator may be restricted in the type of administrative activity (e.g., can only provision resources from a given subset of cloud providers). Other permissions schemes are also possible.

According to the illustrated embodiment, management console 205 stores a set of cloud management policies 220, which may be created, viewed, and/or modified by users of client module 200 via client interface 210. In some embodiments, management policies 220 may be defined as rules-based policies comprising a set of one or more conditions and a set of one or more actions to take when those conditions are met. Specific examples are discussed below with relation to particular types of policies.

Management policies 220 may include policies that serve various ends, such as monitoring policies, resource placement policies, and authorization policies. Monitoring policies may dictate what actions to take in response to runtime conditions on a cloud deployment (e.g., scale-in, scale-out, scale-up, scale-down, provision, de-provision, notify, application reconfiguration, create ticket in a bug tracking system, etc.).

Resource placement policies may control where (e.g., from which provider, data center, and/or physical infrastructure for compute/network/storage) new virtual machines or additional resources for an existing virtual machine should be provisioned or from where they should be removed. Authorization policies may supplement permissions controls 215 by describing the authorization protocols used to evaluate actions of various administrators, as discussed in more detail below.

Monitoring policies may specify respective sets of runtime conditions and one or more actions to take in response to detecting that those conditions exist on the cloud deployment.

The runtime conditions on which monitoring policies are based may be particular to any entity in a cloud deployment, such as various applications, application state, virtual machines, data centers, cloud-providers, networks, and/or any other entity. For example, the runtime conditions of a monitoring policy may include application workload conditions (e.g., number of users logged in, number of concurrent connections, number of database connections free, number of threads, etc.), application health conditions (e.g., average response time of application, application error messages in execution log, etc.), system services layer conditions (e.g., response times of third-party services supporting the application), resource utilization conditions (e.g., percent utilization of CPU, memory, storage, network bandwidth, and/or other computing resources on a given virtual machine), physical machine conditions (e.g., malfunctioning CPU fan, reboot notice, etc.), derived analytics (e.g., geographic distribution of user requests), and/or other types of conditions.

The runtime conditions of a monitoring policy may be combined using arbitrary Boolean logic, such as ANDs, ORs, XORs, parenthetical expressions, etc. For instance, one monitoring policy may dictate that some action be performed when CPU utilization of a virtual machine is greater than 90% (condition 1) and the response time of the application deployed on that virtual machine is greater than 5 ms (condition 2). Another example policy may dictate that some action should be taken when CPU>80% or (memory>80% and response time>7 ms). Various other combinations are possible.

The actions of a monitoring policy (i.e., those to be taken when the corresponding runtime conditions are present) may include provisioning additional resources, de-provisioning unneeded resources, adding additional resources to existing infrastructure or application components, sending an email notification, adding a ticket into a bug tracking system, creating an "event," and/or other actions. For example, one policy may dictate that in response to detecting a particular set of runtime conditions (e.g., conditions indicating unusually high workload at a given virtual machine), the multi-cloud management system should provision additional resources. Those additional resources may be provisioned based on resource placement policies.

In some embodiments, monitoring policies may be implemented using a vote system whereby particular actions are triggered when sufficient "votes" have been gathered from relevant events in a given scope. For example, an event template may be defined in which each type of event is assigned a weight (i.e., votes) with more critical events having more votes. Thus, an event of "CPU usage>80%" at a given virtual machine may be assigned one vote while a crash of a virtual machine may be assigned five votes.

The conditions of a monitoring policy may correspond to a given number of votes having been recorded by given types of events in a given scope. For example, assume that an event template defines the conditions above (i.e., CPU>80% and virtual machine crash) as two events of type "resource constraint" with one and five votes respectively. An example policy condition that utilizes these votes may be that three votes have been registered for a given application by events of type "resource constraint." Thus, the policy's action may be triggered if any three virtual machines implementing a given application report that CPU usage is over 80% or if any one virtual machine implementing the application crashes. Such a vote system may thus allow administrators to create policies pertaining to one or more virtual machines, one or more applications, one or more clouds, and/or other aggregations of resources.

A particular implementation of monitoring policies, according to some embodiments, is described in more detail in Appendix A. The particular implementation corresponds only to some embodiments and is not intended to limit the breadth of this disclosure where broader and/or alternative embodiments are disclosed within this specification.

Another type of management policy is represented by placement policies. Placement policies may be triggered when new resources are provisioned or de-provisioned, either manually by an administrator or automatically by a monitoring policy action. For example, a placement policy may be triggered when a monitoring policy action attempts to provision new resources in response to heavy workload conditions or when an administrator manually provisions new resources without explicitly stating from where those resources should be provisioned. Thus, the placement policies enable automatic and/or transparent placement of new resources and/or de-provisioning of unneeded ones.

A placement policy may define placement logic that is based on various factors, such as any monitored runtime conditions, administrator roles, business goals, and/or static policies. For example, a policy that considers monitored runtime conditions may specify that resources should be provisioned in the geographic region from which the most demand is emanating. In other examples, a placement policy may specify that provisioning requests by administrators with a given role should be fulfilled by a corresponding cloud provider (roles), provisioning should be from the lowest cost provider (business goals), and/or always from a geographic region where the time is currently within regular business hours (static). Various combinations and configurations are possible.

Actions associated with placement policies may specify placement to various degrees of detail. For example, the placement may be to a given cloud provider, a given data center, a given compute cluster, a given hypervisor (i.e., physical machine), a given storage device (e.g., cluster storage, NetApp storage device, etc.), a given network, a given geographical region, and so forth. The placement parameters need not be strictly hierarchical. For example, a geographic region may comprise multiple data centers or a given data center may comprise multiple clouds or cloud providers.

A third type of management policy is represented by authorization policies. Authorization policies may be triggered whenever an administrator (or policy action) attempts to make a configuration change to an application deployment. For example, if a user attempts to provision additional resources for an application, an authorization policy may be triggered to determine whether the user has authority to do so. Actions associated with an authorization policy may include denying the request, granting the request, seeking additional authorization for the request, sending a notification (e.g., to the acting administrator or the users job supervisor) about the request, etc.

In various embodiments, the conditions of an authorization policy may be based on user roles, runtime monitoring information, business goals, and/or other factors. For example, an authorization policy may indicate that if any administrator with a given role attempts to provision more than N virtual machines for a given application, then the administrator's supervisor must approve the request. In a further refinement that incorporates monitoring information, the example policy may not require approval if the CPU utilization rate of all the virtual machines is above 80%. In a further refinement that incorporates business goals, the example policy may nevertheless require approval if the overall cost of provisioning the additional infrastructure would exceed a pre-set cost goal.

In some embodiments, when an authorization action requires a supervisor's approval, the multi-cloud management system may seek that approval using different utilities. For example, in some embodiments, client interface 210 of management console 205 (e.g. web portal) may include a web interface configured to display a queue of requests to a supervisor and allow the supervisor to approve or deny those requests through the web interface. In some cases, when an organization has deployed separate business workflow tools, the multi-cloud management system may integrate with those tools to seek approval of provisioning requests. For example, the multi-cloud management system may be configured to insert requests for approval into the business workflow tools via web services exposed by such tools. Thus, in some embodiments, a supervisor may view and approve or deny requests using the organization's pre-existing business workflow tools.

According to the illustrated embodiment, management console 205 may include a services console interface 225 for pushing cloud management policies 220 to service console 230. As shown in FIG. 1, services console interface 225 may be configured to communicate with services console 230 over a wide area network, such as the Internet. For security, in some embodiments, service console interface 225 may be configured to maintain only a single network port to service console 230 and no connection to cloud 255. By storing a local copy of policies 220, such policies may be viewed and/or modified locally before committing the policies to service console 230.

As described above, management console 205 provides client interface 210 (e.g., web portal in a browser) with which a user of client module 200 may set one or more multi-cloud management policies and/or monitor the applications and virtual machines deployed on the clouds. In some embodiments, client interface 210 may provide a web portal interface with which an administrator may view and monitor applications deployed on the multi-cloud infrastructure, provision resources and/or applications, manage administrator accounts, set cloud management policies, and/or perform other maintenance functions. Management console 205 is therefore concerned with managing a body of users (i.e., administrators), providing those users with information necessary to make policy decisions, and allowing those users to set the desired management policies 220. Once management console 205 has gathered the desired set of management policies, it passes those policies to service console 230 to be implemented.

Multi-cloud management system 280 includes service console 230 for implementing user-defined management policies 220. As described above, service console 230 may, in some embodiments, be provided as a service by a third-party cloud management provider. Thus, a cloud management provider may service multiple organizations by hosting separate service consoles for each. Such a configuration may allow the service console 230 to be professionally managed rather than managed internally by an organization's IT department, thereby insuring that the service console is highly available and scalable. However, in other embodiments, an organization that prefers to maintain control over the service console may deploy service console 230 on its own private network.

As shown in FIG. 2, service console 230 includes configuration database 235. Configuration database 235 may maintain data regarding an organization's cloud deployments. The database may include current deployment data, such as that identifying which applications are deployed, what computing resources are provisioned for those applications, from where (e.g., which clouds, data centers, clusters, etc.) the resources are provisioned, and any other description of the current state of deployment. Additionally, configuration database 235 may include configuration information, such as application configuration information, virtual machine templates for provisioning new machines, a copy of management policies 220, account information for accounts at different cloud providers, and/or any other configuration information needed for managing a multi-cloud deployment.

In some embodiments, configuration database 235 may include one or more virtual machine templates that can be used to provision new virtual machines for a target application. A virtual machine template may include the software environment supporting the application, so that fully configured virtual machines may be provisioned quickly and/or automatically. In some embodiments, a virtual machine template for an application may be created when an application is registered in the database. Subsequently, when resources must be provisioned to support the application, the template may be used. The provisioning of new machines using the template may be included in the action part of a monitor and/or placement rule.

In some embodiments, an administrator may set up a template in configuration database 235 for easy manual provisioning. For example, a leader of a test team may create several templates and provide test team members with access to those templates. When a test team member logs into the web portal provided by management console 205, the user may be presented with the predefined templates and be able to quickly deploy virtual machines according to those templates (e.g., by pressing a button corresponding to the selected template). Thus, the templates stored in configuration database 235 may provide "single-click" access to deploying pre-defined virtual machine templates. In various embodiments, any user in a business unit/department may configure service policies and publish them to other users for use; the user interface for a user may show a list of available service profiles, which the user may deploy with a single click.

According to the illustrated embodiment, service console 230 includes monitoring engine 240 for monitoring cloud deployments. Monitoring engine 240 may be configured to monitor the runtime conditions of cloud deployments. The runtime conditions may be reported to administrators (e.g., via the web portal of client interface 210) and/or be used to trigger monitoring policies.

Monitoring engine 240 may be configured to monitor runtime conditions by placing software agents on deployed virtual machines and using those agents to track runtime conditions on the virtual machines. For example, monitoring engine 240 has deployed monitoring agents 270a-270n on virtual machines 260a-260n of cloud 255 to monitor application 265. Using agents 270, monitoring engine 240 may track runtime conditions, such as those described above with relation to monitoring policies (e.g., workload characteristics, application health characteristics, resource utilization characteristics, derived metrics, etc.).

In various embodiments, monitoring engine 240 may collect runtime conditions using any of various push or pull techniques. For example, monitoring engine 240 may be configured to collect runtime conditions at each virtual machine by periodically receiving reports of local conditions (e.g., resource utilization metrics) from respective agents hosted on those machines. In another example, monitoring engine 240 may be configured to determine some runtime conditions (e.g., response time) through direct testing rather than through agent reports. For example, monitoring agent may determine the response time of application 265 by sending a request and timing the response from cloud 255.

Monitoring engine 240 may provide analytics to administrators by reporting those metrics to management console 205. Administrators may then utilize client module 200 and client interface 210 to view the metrics and/or analytics derived from the metrics. For example, administrators using client module 200 to access a web portal implemented by client interface 210, may be permitted to view current runtime conditions (e.g., workload, resource utilization, etc.), historical comparisons, visualizations, and/or other information about the current deployments.

In some embodiments, monitoring engine 240 may be configured to make policy and/or provisioning recommendations based on the data. For example, if workload levels are too high for the current resource allocation, monitoring engine 240 may recommend a more appropriate level of resources to provision. Such recommendations may rely on historical performance measurements of the application under different workloads and resource allocations.

In some embodiments, monitoring engine 240 may be configured to create "events" based on the data it gathers. In some embodiments, an event may be created in response to the monitoring engine receiving certain information (e.g., a report from each agent), in response to the monitoring engine determining that particular received metrics are outside of healthy thresholds (e.g., CPU utilization of a given virtual machine is too high or too low), and/or in response to arbitrary other conditions.

An event created by the monitoring engine 240 may comprise a description of the event (e.g., an event code), various data collected (or derived) by the monitoring engine in response to which the event was created, and/or other relevant data. Events created by the monitoring engine may be specific to particular virtual machines, to particular applications, to particular layers of an application, and/or to other entities in the deployment. Events created by the monitoring engine 240 may be passed to and processed by the policy engine 245.

Policy engine 245 may be configured to implement the user-defined management policies (e.g., policies 220) provided by management console 205. Policy engine 245 may receive events, such as those generated by monitoring engine 240, and compare those events to the conditions of each user-defined policy. If the event indicates that a policy's conditions are met, the policy engine 245 may trigger the action associated with that policy. Events may be compared against every policy each time or in a short-circuit fashion such that only the first matched policy is executed. The policies may be ordered by an administrator and/or automatically by the system.

Consider the following example of operation. A user has set a monitoring policy ("memory policy") that indicates that whenever a virtual machine executing some application is found to be utilizing more than 80% of its memory resources (condition), then a new machine should be provisioned for the application according to a given template (action). Suppose also that monitoring engine 240 is configured to receive resource utilization metrics from agents 270 every two seconds and to bundle those resource utilization metrics into a single event.

In this example, monitoring engine 240 receives a report from agents 270 and passes the event to policy engine 245. Policy engine 245 determines that the event is of a monitoring type. Because the event is of a monitoring type, policy engine 245 compares the information within the event (i.e., the resource utilization metrics) to each monitoring policy in order.

Suppose that the resource utilization metrics show that one of the virtual machines is utilizing 90% of its memory. In this case, the condition for "memory policy" is met.

When policy engine 245 compares the event to the conditions of the memory policy, it determines that the conditions are met and therefore triggers the action of provisioning a new virtual machine according to the given template.

In response to an attempt by the policy engine to provision a new virtual machine, a location-general provisioning event is created (e.g., by the policy engine) and handled by the policy engine. The event may include information indicating that it is a location-general provisioning type event, which application the provisioning concerns, which rule triggered the provisioning, and/or other relevant event data.

The policy engine recognizes that the event is a location-general provisioning event and compares it to the sequence of placement policies. Suppose that the first placement policy indicates that provisioning events created automatically in response to monitoring actions are to be provisioned at the lowest cost cloud provider. This policy is an example of a policy with conditions based on business goals. The action of the placement policy may be to determine which is currently the lowest-cost provider and to attempt to deploy a new virtual machine on that provider.

In response to the attempt by the policy engine to provision a new virtual machine at the specified lowest-cost provider, a location-specific provisioning event is created (e.g., by the policy engine) and handled by the policy engine. The event may include information indicating the type of event, which application the provisioning concerns, which rule triggered the event, and/or other data describing the event.

The policy engine recognizes that the event is a location-specific provisioning event and compares it to the sequence of authorization policies. Suppose that one of the authorization policies states that no more than three virtual machines can be allocated to the application without approval from an administrator. In response, policy engine may perform a lookup in configuration database 235 to determine the number of virtual machines currently executing the application. Upon discovering that the threshold of three machines is already met, the policy engine may seek approval from the supervisor.

To get approval from the supervisor, policy engine 245 invokes a web service provided by a third-party business workflow tool to request approval. Policy engine 245 then places the provisioning request on hold. When the supervisor approves, the business workflow tool indicates to policy engine 245 that the request was approved and policy engine 245 invokes cloud provisioning engine 250 to perform the provisioning. Notification engine 252 then sends notifications (e.g., email, SMS) to relevant administrators to notify them of the provisioning action.

Different cloud providers may expose different programmatic interfaces with which clients may interact with the cloud. For example, each cloud provider may expose a respective set of web services that a client can invoke to provision and/or de-provision resources.

Provisioning engine 250 may encapsulate the logic necessary for service console 230 to interface seamlessly with multiple different cloud providers. Provisioning engine 250 may expose a generic provisioning interface that users or internal components may invoke to provision and/or de-provision resources from different cloud providers without specialized knowledge of that provider's underlying interfaces and protocols. For instance, provisioning engine 250 may expose a generic "createVM( )" interface and when the generic interface is invoked, provisioning engine 250 may determine the target cloud provider and invoke a respective, provider-specific module to provision the required resources. Thus, the invoking entity (e.g., user, policy engine, etc.) need not have knowledge of how to provision resources on each different cloud. In different instances, the target cloud provider may be determined based on placement policies or provided to the generic interface as an invocation parameter.

As discussed above, the provisioning engine may be invoked directly by an administrator or by an automated component, such as by monitoring engine 240 executing a monitoring action, or by any combination thereof. For example, an administrator may log into a web portal provided by management console 205 and manually request that a new virtual machine be provisioned without specifying where. The management console may encapsulate the request and send it to the service console 230 for actuation. The policy engine 245 may receive the provisioning request event and apply a placement policy to determine a target cloud provider. The policy engine 245 may then invoke the generic provisioning interface of cloud provisioning engine 250 to actuate the provisioning. The policy engine 245 may pass the identity of the selected provider and/or any other determined placement information to the invoked function, for example, as invocation parameters.

In some embodiments, provisioning engine 250 may provision different tiers of a single application on different clouds. For example, an administrator may specify the tiers of an application and the service level requirements for each. The request may be sent to service console 230, which may use various placement policies to decide that the requirements of each tier may be best served by machines provided by different providers. Service console 230 may then use cloud provisioning logic 250 to provision virtual machines on different providers and to deploy different tiers of the application across the different machines.

According to the illustrated embodiment, service console 230 also includes scheduler 254. Scheduler 254 may be user-configurable to execute batch jobs according to a static schedule. For example, an administrator may configure scheduler 254 to provision a given application during certain hours of the day and/or days of the week and to de-provision the application at other times. For example, an organization that has deployed an internal social networking application on one or more clouds may not want to waste money executing the application outside of business hours. Accordingly, an administrator may set a schedule that provisions and starts the application each weekday at the start of the workday and de-provisions it after working hours.

In various embodiments, management console 205 and/or service console 230 may include additional and/or fewer components. For example, the functionality of different components may be combined and/or decomposed further in different embodiments.

Figure 3:
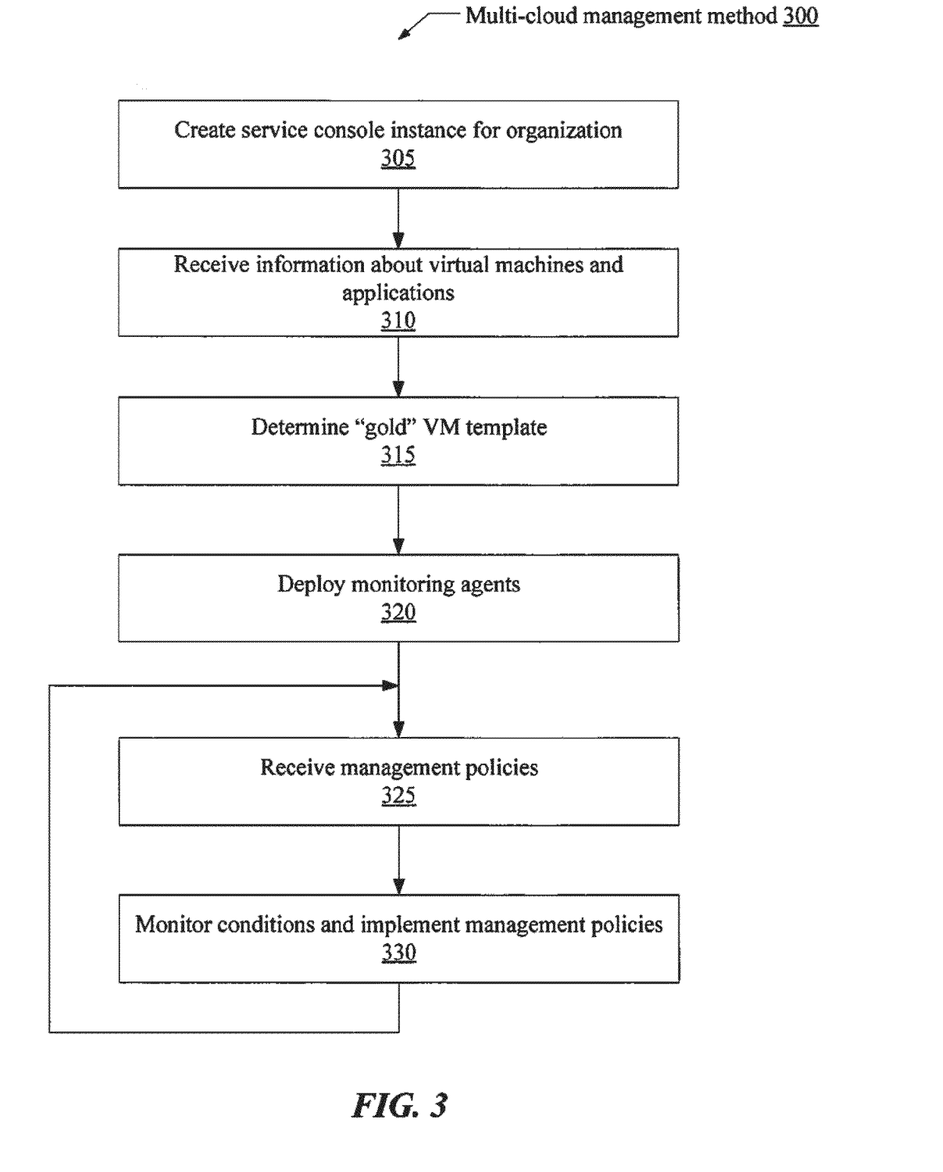
FIG. 3 is a flow diagram illustrating a multi-cloud management method, according to some embodiments.

FIG. 3 is a flow diagram illustrating a multi-cloud management method, according to some embodiments. Method 300 of FIG. 3 may be implemented by a multi-cloud management provider using service console servers, such as 125.

Method 300 begins at 305 by creating a service console instance for an organization. The multi-cloud management provider may deploy a separate service console instance for each organization.

In 310, the service console receives information about the cloud deployments that the organization has, including information regarding the virtual machines and applications that the organization currently has deployed. The service console may store such information in a configuration database, such as 235.

Based on the deployment information gathered in 310, the service console may determine a "gold" virtual machine template, as in 315, which it may later use to provision new virtual machine instances.

In 320, the service console may deploy monitoring agents (e.g., monitoring agents 270 of FIG. 2) to monitor runtime conditions on the deployed virtual machines. In 325, the service console may receive management policies. In 330, the service console monitors runtime conditions using the agents and implements the management policies, as described in detail above with relation to FIG. 2. Periodically, the service console may receive updated policies for implementation, as indicated by the feedback loop from 330 to 325.

As described in detail above, a multi-cloud management middleware system has been disclosed that mitigates many of the challenges of deploying applications in multiple cloud computing environments. A single generic interface is provided for managing deployments on multiple clouds without needing knowledge of the specific protocols necessary for interacting with each cloud provider. Facilities are provided for automatically monitoring virtual machines via agents and direct measurements, as well as for automatically re-provisioning resources in response to changes in runtime conditions. Facilities are provided for intelligent provisioning of cloud-based resources via intelligent placement policies. Authorization facilities, including integration with business workflow systems, are provided for centralized control over distributed provisioning decisions. Furthermore, facilities for simple deployment of pre-defined network applications on custom virtual infrastructure are provided via templates and "one-click" virtual machine deployments.

Figure 4:
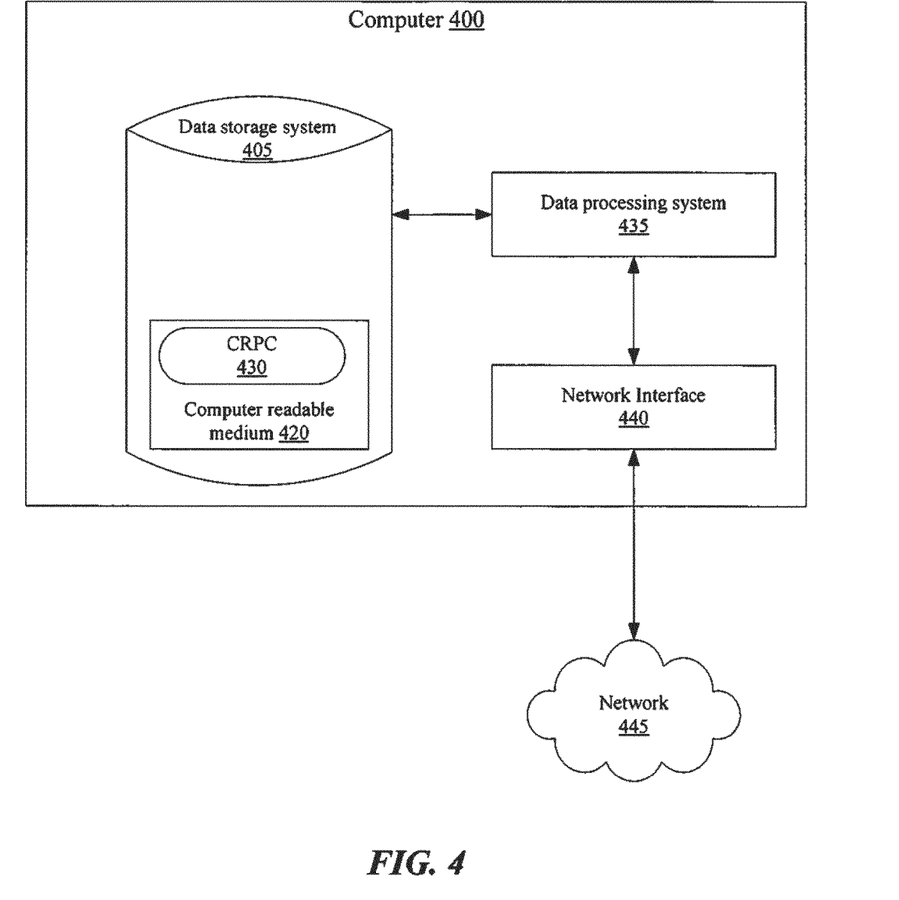
FIG. 4 illustrates a possible implementation for at least some components of a physical computer, according to some embodiments.

FIG. 4 illustrates a possible implementation for at least some components of a physical computer, according to some embodiments. In some embodiments, computer 400 may correspond to any physical computer, such as any of servers 115, 125, and or nodes in clouds 130a or 130b. In some embodiments, the physical components illustrated in FIG. 4 may be simulated by virtual components of a virtual machine, such as any of virtual machines 260 of FIG. 2.

As shown in FIG. 4, computer 400 may include a data processing system 435. In some embodiments, data processing system 435 may include any number of computer processors, any number of which may include one or more processing cores. In some embodiments, any of the processing cores may be physical or logical. For example, a single core may be used to implement multiple logical cores using symmetric multi-threading.

Computer 400 also includes network interface 440 for receiving messages (e.g., messages transmitted from clients 105) and transmitting messages over network 445, and a data storage system 405, which may include one or more computer-readable mediums. The computer-readable mediums may include any number of persistent storage devices (e.g., magnetic disk drives, solid state storage, etc.) and/or transient memory devices (e.g., Random Access Memory).

In embodiments where data processing system 435 includes a microprocessor, a multi-cloud management system or any subcomponents may be provided as a computer program product. Such a computer program product may include computer readable program code 430, which implements a computer program, stored on a computer readable medium 420. Computer readable medium 420 may include magnetic media (e.g., a hard disk), optical media (e.g., a DVD), memory devices (e.g., random access memory), etc. In some embodiments, computer readable program code 430 is configured such that, when executed by data processing system 435, code 430 causes the processing system to perform steps described above.

In other embodiments, computer 400 may be configured to perform steps described above without the need for code 430. For example, data processing system 435 may consist merely of specialized hardware, such as one or more application-specific integrated circuits (ASICs). Hence, the features of the present invention described above may be implemented in hardware and/or software. For example, in some embodiments, the functional components described above may be implemented by data processing system 435 executing computer instructions 430, by data processing system 435 operating independent of any computer instructions 430, or by any suitable combination of hardware and/or software.

While various embodiments of the present invention have been described above, it should be understood that they have been presented by way of example only, and not limitation. Thus, the breadth and scope of the present invention should not be limited by any of the above-described exemplary embodiments.

The invention claimed is:

1. A system for managing application deployments on cloud infrastructures, the system comprising:
   a services console for storing management policies, wherein each management policy:
   corresponds to a respective application deployment on one or more clouds, and
   indicates one or more potential runtime conditions and one or more corresponding management actions;
   a monitoring engine for:
   monitoring runtime conditions of the application deployments, wherein monitoring the runtime conditions comprises:
   deploying one or more software agents on one or more respective virtual machines in the application deployments, and
   receiving one or more periodic reports from the software agents regarding runtime conditions on the respective virtual machines, and
   determining that the runtime conditions in the one or more periodic reports of a given application deployment match the one or more potential runtime conditions indicated by a given management policy corresponding to the given application deployment; and
   a policy engine for responding to the determination of the monitoring engine by performing the one or more management actions of the given management policy corresponding to the one or more potential runtime conditions that match the one or more runtime conditions of the given application deployment.

2. The system of claim 1, further comprising a management console configured to present a user with an interface configured to receive the management policies.

3. The system of claim 2, wherein the interface is configured to enable the user to create management policies for multiple cloud infrastructures.

4. The system of claim 2, wherein the interface is a web portal.

5. The system of claim 2, wherein the management console is further configured to store authorization policies, wherein each authorization policy:
   corresponds to a respective application deployment on one or more clouds, and
   comprises parameters for determining whether a given user has authority to perform a given management action on the application deployment.

6. The system of claim 5, wherein an authorization policy indicates that in response to an attempt to perform a given management action, the management console performs one or more of: authorize the attempt, deny the attempt, seek authorization of the attempt, and send a notification to a user other than the given user attempting to perform the management action.

7. The system of claim 6, wherein the parameters include one or more of: a role of the given user, runtime conditions of the application deployment, and business goals.

8. The system of claim 6, wherein the management console is configured to seek authorization of the attempt using a programmatic interface of a business workflow tool.

9. The system of claim 1, wherein the system comprises multiple service consoles, each dedicated to serving a different respective organization.

10. The system of claim 1, further comprising a configuration database that maintains data describing the application deployments, including data describing one or more of: identities of the applications deployed, respective computing resources provisioned for the applications, respective sources of the computing resources provisioned for the applications, respective configuration information for the applications, and respective virtual machine templates for the applications.

11. The system of claim 1, wherein the monitoring engine is configured to monitor runtime conditions of the application deployments on multiple cloud infrastructures.

12. The system of claim 1, wherein the services console is further configured to store resource placement policies, wherein each resource placement policy:
   corresponds to a respective application deployment on one or more clouds, and
   comprises parameters for identifying one or more preferred sources from which additional computing resources can be provisioned for the application deployment.

13. The system of claim 12, wherein the parameters are dependent on one or more of: monitored runtime conditions of the application deployment, administrator roles, business goals, and static policies.

14. The system of claim 12, wherein the preferred sources identified comprise one or more of: a specific cloud provider, a specific cloud account, a specific data center, a specific compute cluster, a specific hypervisor, a specific storage device, and a specific geographic region.

15. The system of claim 1, wherein the potential runtime conditions comprise conditions related to one or more of:

workload conditions, system services layer conditions, resource utilization conditions, physical machine conditions, and derived analytics.

16. The system of claim 1, wherein at least one of the potential runtime conditions is expressed as a Boolean combination of two or more potential runtime conditions.

17. The system of claim 1, wherein each management action corresponds to one or more of: provisioning resources to the corresponding application deployment, deprovisioning resources to the corresponding application deployment, adding a ticket to a bug tracking system, and creating an event that triggers another of the management policies.

18. The system of claim 1, wherein the monitoring engine is further configured to perform: in response to determining that the runtime conditions of a given application deployment match the one or more potential conditions, incrementing a counter, wherein the policy engine performs the management action when the counter reaches a given count.

19. The system of claim 18, wherein the monitoring engine is configured to increment the same counter by a different weight in response to determining that the runtime conditions of a given application deployment match the potential runtime conditions of different management policies.

20. A computer-implemented method for managing application deployments on cloud infrastructures, the method comprising:
receiving, by a computer, management policies, wherein each management policy:
corresponds to a respective application deployment on one or more clouds, and
indicates one or more potential runtime conditions and one or more corresponding management actions;
monitoring, by a computer, runtime conditions of the application deployments, wherein monitoring the runtime conditions comprises:
deploying software agents on respective virtual machines in the application deployments, and
receiving periodic reports from the software agents regarding runtime conditions on the respective virtual machines;
determining, by a computer, that the runtime conditions in the one or more periodic reports of a given application deployment match the one or more potential runtime conditions indicated by a given management policy corresponding to the given application deployment; and
responding, by a computer, to the determining by performing the one or more management actions of the given management policy corresponding to the one or more potential runtime conditions that match the one or more runtime conditions of the given application deployment.

21. The method of claim 20, further comprising presenting a user with an interface configured to receive the management policies.

22. The method of claim 21, wherein the interface is configured to enable the user to create management policies for multiple cloud infrastructures.

23. The method of claim 21, wherein the interface is a web portal.

24. The method of claim 21, further comprising storing authorization policies, wherein each authorization policy:
corresponds to a respective application deployment on one or more clouds, and
comprises parameters for determining whether a given user has authority to perform a given management action on the application deployment.

25. The method of claim 24, wherein an authorization policy indicates that in response to an attempt to perform a given management action, a computer performs one or more of: authorize the attempt, deny the attempt, seek authorization of the attempt, and send a notification to a user other than the given user attempting to perform the management action.

26. The method of claim 25, wherein the parameters include one or more of: a role of the given user, runtime conditions of the application deployment, and business goals.

27. The method of claim 25, further comprising: seeking authorization of the attempt using a programmatic interface of a business workflow tool.

28. The method of claim 20, wherein the monitoring comprises monitoring runtime conditions of the application deployments on multiple cloud infrastructures.

29. The method of claim 20, further comprising storing resource placement policies, wherein each resource placement policy:
corresponds to a respective application deployment on one or more clouds, and
comprises parameters for identifying one or more preferred sources from which additional computing resources can be provisioned for the application deployment.

30. The method of claim 29, wherein the parameters are dependent on one or more of: monitored runtime conditions of the application deployment, administrator roles, business goals, and static policies.

31. The method of claim 29, wherein the preferred sources identified comprise one or more of: a specific cloud provider, a specific cloud account, a specific data center, a specific compute cluster, a specific hypervisor, a specific storage device, and a specific geographic region.

32. The method of claim 20, wherein the potential runtime conditions comprise conditions related to one or more of: workload conditions, system services layer conditions, resource utilization conditions, physical machine conditions, and derived analytics.

33. The method of claim 20, wherein at least one of the potential runtime conditions is expressed as a Boolean combination of two or more potential runtime conditions.

34. The method of claim 20, wherein each management action corresponds to one or more of: provisioning resources to the corresponding application deployment, deprovisioning resources to the corresponding application deployment, adding a ticket to a bug tracking system, and creating an event that triggers another of the management policies.

35. The method of claim 20, further comprising: in response to determining that the runtime conditions of a given application deployment match the one or more potential conditions, incrementing a counter, wherein the policy engine performs the management action when the counter reaches a given count.

36. The method of claim 35, further comprising: incrementing the counter by a different weight in response to determining that the runtime conditions of a given application deployment match the potential runtime conditions of different management policies.

37. A computer-readable storage medium storing program instructions executable by a computer to implement:
a services console for storing management policies, wherein each management policy:
corresponds to a respective application deployment on one or more clouds, and
indicates one or more potential runtime conditions and one or more corresponding management actions;
a monitoring engine for:

monitoring runtime conditions of the application deployments, wherein monitoring the runtime conditions comprises:
deploying one or more software agents on one or more respective virtual machines in the application deployments, and
receiving one or more periodic reports from the software agents regarding runtime conditions on the respective virtual machines, and
determining that the runtime conditions in the one or more periodic reports of a given application deployment match the one or more potential runtime conditions indicated by a given management policy corresponding to the given application deployment;
a policy engine for responding to the determination of the monitoring engine by performing the one or more management actions of the given management policy corresponding to the one or more potential runtime conditions that match the one or more runtime conditions of the given application deployment.

38. The computer-readable medium of claim 37, wherein the services console is further configured to store resource placement policies, wherein each resource placement policy:
corresponds to a respective application deployment on one or more clouds, and
comprises parameters for identifying one or more preferred sources from which additional computing resources can be provisioned for the application deployment.

\* \* \* \* \*